United States Patent [19]

Schoennagel

[11] B 3,914,171

[45] Oct. 21, 1975

[54] HYDROCARBON REFORMING PROCESS WITH HEATED AROMATIC RECYCLE

[75] Inventor: Hans-Juergen Schoennagel, Trenton, N.J.

[73] Assignee: Mobil Oil Corporation, New York, N.Y.

[22] Filed: Aug. 16, 1973

[21] Appl. No.: 389,070

[44] Published under the Trial Voluntary Protest Program on January 28, 1975 as document no. B 389,070.

[52] U.S. Cl. .............................. 208/135; 260/673.5
[51] Int. Cl.² ......................................... C10G 35/06
[58] Field of Search .......... 208/135, 141; 260/673.5

[56] References Cited
UNITED STATES PATENTS

| | | | |
|---|---|---|---|
| 2,349,045 | 5/1944 | Laying et al. .................... | 260/673.5 |
| 2,955,080 | 10/1960 | Carter ................................ | 208/141 |
| 2,985,581 | 5/1961 | Alliston et al. ...................... | 208/65 |
| 3,250,816 | 5/1966 | Waldby .............................. | 208/138 |
| 3,501,542 | 3/1970 | Carr et al. ......................... | 260/673.5 |
| 3,729,409 | 4/1973 | Chen .................................. | 208/135 |
| 3,756,942 | 9/1973 | Cattanach .......................... | 208/141 |

*Primary Examiner*—Delbert E. Gantz
*Assistant Examiner*—James W. Hellwege
*Attorney, Agent, or Firm*—Charles A. Huggett; Michael G. Gilman

[57] ABSTRACT

Improvements in the adiabatic conversion of aliphatics to aromatics in high yield by the action of a ZSM-5 type of zeolite catalyst by providing the heat input necessary to support the conversion in the form of a recycled, heated portion of the liquid product resulting from this conversion.

8 Claims, No Drawings

HYDROCARBON REFORMING PROCESS WITH HEATED AROMATIC RECYCLE

This invention relates to the conversion of aliphatic hydrocarbons to aromatic hydrocarbons. It more particularly refers to improving that portion of the processes which are endothermic.

Several processes have recently been proposed for converting aliphatic petroleum fractions to aromatic materials by contacting them with a ZSM-5 type of crystalline aluminosilicate zeolite at elevated temperatures and low space velocities. These processes preferably operate in the absence of added hydrogen and, with certain types of feeds, are endothermic.

According to one of these processes, a normally liquid hydrocarbon having a boiling range of from $C_5$ to an upper limit wherein at least 50 volume percent boils no higher than 250°F, consisting essentially of paraffins, olefins, naphthenes and mixtures thereof, which may additionally contain an aromatics fraction which is substantially inert to the conversion conditions of the process, is contacted with a crystalline aluminosilicate zeolite of the ZSM-5 type at at least about 650°F at a space velocity equivalent to up to about 15 WHSV in a fixed bed situation so as to convert most of the non-aromatics feed to a product comprising at least 30 weight percent aromatics (based on the non-aromatic portion of the feed.)

According to another recently developed process, aromatics are produced by converting $C_2$ to $C_4$ paraffins and/or olefins in contact with a crystalline aluminosilicate zeolite of the ZSM-5 type at about 200° to 1500°F.

In both of these recently developed processes, the catalyst is a zeolite of the ZSM-5 type.

ZSM-5 type zeolites include not only ZSM-5 but also ZSM-8 zeolites. ZSM-5 materials are disclosed and claimed in copending application Ser. Number 865,472, filed Oct. 10, 1969, now U.S. Pat. No. 3,702,886 and ZSM-8 is disclosed and claimed in copending application Ser. Number 865,418, filed Oct. 10, 1969 now abandoned.

The family of ZSM-5 compositions has the characteristic x-ray diffraction pattern set forth in Table 1, hereinbelow. ZSM-5 compositions can also be identified, in terms of mole ratios of oxides as follows:

$$0.9 \pm 0.2 \ M_{2/n}O : W_2O_3 : 5\text{--}100 \ YO_2 : z \ H_2O$$

wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$$0.9 \pm 0.2 \ M_{2/n}O : Al_2O_3 : 5\text{--}100 \ SiO_2 : z \ H_2O$$

and M is selected from the group consisting of a mixture of alkali metal cations, especially sodium and tetraalkyl-ammonium cations, the alkyl groups of which preferably contain 2-5 carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose x-ray diffraction pattern shows the following significant lines:

TABLE I

| Interplanar Spacing d (A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other x-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 I/I, where I is the intensity of the strongest line or peak, and d(obs.), the interplanar spacing in A, corresponding to the recorded lines, were calculated. In Table I the relative intensities are given in terms of the symbols S = strong, M = medium, MS = medium strong, MW = medium weak and VS = very strong. It should be understood that this x-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-Ray Diffraction
ZSM-5 Powder in Cation Exchanged Forms
d Spacings Observed

| As Made | HCL | NaCl | CaCl$_2$ | RECl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 4.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |

TABLE 2-Continued

X-Ray Diffraction
ZSM-5 Powder in Cation Exchanged Forms
d Spacings Observed

| As Made | HCL | NaCl | CaCl₂ | RECl₃ | AgNO₃ |
|---|---|---|---|---|---|
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing water, tetrapropyl ammonium hydroxide and the elements of sodium oxide, an oxide of aluminum or gallium and an oxide of silicon, and having a composition, in terms of mole ratios of oxides, falling within the following ranges:

TABLE 3

|  | Broad | Preferred | Particularly Preferred |
|---|---|---|---|
| OH-SiO₂ | 0.07–1.0 | 0.1–0.8 | 0.2–0.75 |
| R₄N+/R₄N+ₓNa+) | 0.2–0.95 | 0.3–0.9 | 0.4—0.9 |
| H₂O/OH- | 10–300 | 10–300 | 10–300 |
| YO₂/W₂O₃ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75°C to 175°C for a period of about 6 hours to 60 days. A more preferred temperature range is from about 90° to 150°C, with the amount of time at a temperature in such range being from about 12 hours to 20 days.

The digestion of the gel particles is carried out until crystals form. The solid product is separated from the reaction medium, as by cooling the whole to room temperature, filtering and water washing.

ZMS-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, (see U.S. patent application Ser. No. 865,418, filed Oct. 10, 1969, now abandoned) in terms of mole ratios of oxides, as follows:

$0.9 \pm 0.2 \, M_{2/n}O : Al_2O_3 : 5\text{-}100 \, SiO_2 : H_2O$ wherein M is at least one cation, n is the valence thereof and z is from 0 to 40. In a preferred synthesized form, the zeolite has a formula, in terms of mole ratios of oxides as follows:

$0.9 \pm 0.2 \, M_{2/n}O : Al_2O_3 : 10\text{-}60 \, SiO_2 : z \, H_2O$ and M is selected from the group consisting of a mixture of alkali metal cations, especially sodium, and tetraethylammonium cations.

ZSM-8 possesses a definite distinguishing crystalline structure having the following x-ray diffraction pattern:

TABLE 4

| dA° | I/Io | I/Io | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |

TABLE 4-Continued

| dA° | I/Io | I/Io | dA° |
|---|---|---|---|
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a water solution containing either tetraethylammonium hydroxide or tetraethylammonium bromide together with the elements of sodium oxide, alluminum oxide, and an oxide of silica. See U.S. Pat. No. 3,709,979 for information relative to ZSM-11.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reaction said materials in such proportions that the forming solution has a composition in terms of mole ratios of oxides falling within the following range:

$SiO_2/Al_2O_3$ — from about 10 to about 200
$Na_2O$/tetraethylammonium hydroxide — from about 0.05 to 0.020
Tetraethylammonium hydroxide/$SiO_2$ — from about 0.08 to 1.0
$H_2O$/tetraethylammonium hydroxide — from about 80 to about 200

Thereafter, the crystals are separated from the liquid and recovered. Typical reaction conditions consist of maintaining the foregoing reaction mixture at a temperature of from about 100°C to 175°C for a period of time of from about 6 hours to 60 days. A more preferred temperature range is from about 150° to 175°C with the amount of time at a temperature in such range being from about 12 hours to 8 days.

The ZSM-5 type zeolites used in the instant invention usually have the original cations associated therewith replaced by a wide variety of other cations according to techniques well known in the art. Typical replacing cations would include hydrogen, ammonium and metal cations including mixtures of the same. Of the replacing cations, particular preference is given to cations of hydrogen, ammonium, rare earth and mixtures thereof.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pats. Nos. 3,140,249, 3,140,251 and 3,140,253.

Following contact with the salt solution of the desired replacing cation, the zeolites may be washed with water and dried at a temperature ranging from 150°F to about 600°F and thereafter heated in air or other suitable gas temperatures ranging from about 500°F to 1500°F for periods of time ranging from 1 to 48 hours or more.

It is also possible to treat the zeolite with steam at elevated temperatures ranging from 800°F to 1600°F and preferably 1000°F and 1500°F, if such is desired. The treatment may be accomplished in atmospheres consisting partially or entirely of steam.

A similar treatment can be accomplished at lower temperatures and elevated pressures, e.g. 350°–700°F at 10 to about 200 atmospheres.

One embodiment of this invention resides in the use of a porous matrix together with the ZSM-5 type zeolite previously described. The ZSM-5 type zeolite can be combined, dispersed or otherwise intimately admixed with a porous matrix in such proportions that the resulting product contains from 1% to 95% by weight, and preferably from 20 to 80% by weight, of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, and inorganic oxides. Inorganic compositions especially those of a siliceous nature are preferred. Of these matrices, inorganic oxides such as clay, chemically treated clay, silica, silica-alumina, etc. are particularly preferred because of their superior porosity, attrition resistance and stability.

The compositing of the aluminosilicate zeolite with an inorganic oxide can be achieved by several methods wherein the aluminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by a hydrolyzing a basic solution of alkali metal silicate with an acid such as hydrochloric, sulfuric, acetic, etc. The mixing of the three components can be accomplished in any desired manner, such as in a ball mill or other types of mills. The aluminosiliicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Pat. No. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc. to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide, or in the dried state.

The catalytically active inorganic oxide matrix may also consist of a plural gel comprising a predominant amount of silica with one or more metals or oxides thereof selected from groups IB, II, III, IV, V, VI VII, and VIII of the Periodic Table. Particular preference is given to plural gels of silica with metal oxides of Groups IIA, III and IVa of the Periodic Table, especially wherein the metal oxide is rare earth oxide, magnesia, alumina, zirconia, titania, beryllia, thoria, or combinations thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The inorganic oxide may also consist of raw clay or a clay mineral which has been treated with an acid medium to render it active. The aluminosilicate can be incorporated into the clay simply by blending the two and fashioning the mixture into desired shapes. Suitable clays include attapulgite, kaolin, sepiolite, polygarskite, kaolinite, halloysite, plastic ball clays, bentonite, montmorillonite, illite, chlorite, etc.

Other useful matrices include powders of refractory oxides, such as alumina, alpha alumina, etc. having very low internal pore volume. Preferably, these materials have substantially no inherent catalytic activity of their own.

The catalyst product can be heated in steam or in other atmospheres, e.g. air, near the temperature contemplated for conversion but may be heated to operating temperatures initially during use in the conversion process. Generally, the catalyst is dried between 150°F and 600°F and thereafter may be calcined in air, steam, nitrogen, helium, flue gas or other gases not harmful to the catalyst product at temperatures ranging from about 500°F to 1600°F for periods of time ranging from 1 to 48 hours or more. It is to be understood that the aluminosilicate can also be calcined prior to incorporation into the inorganic oxide gel. It is also to be understood that the aluminosilicate or aluminosilicates need not be ion exchanged prior to incorporation in a matrix but can be so treated during or after incorporation into the matrix.

In the second of these referred to processes, hydrogen may, but need not, be added to the system. In both of these processes a hydrogenation/dehydrogenation component may, but need not, be added to the zeolite catalyst. In both of these processes the zeolite catalyst may have a cation exchanged and/or impregnated thereinto.

In the absence of lower olefins from the feed, both of these processes are quite endothermic, a temperature drop of from about 300° to 600°F being experienced in an adiabatic reaction zone. It is of course necessary therefore to provide heat input into the reaction zone. Endothermic conditions have often been encountered in other petroleum conversion processes. The need for heat input has in the past been provided for by preheating hydrogen or methane, compressing such gases before or after heating and then feeding such compressed heated gases into the reaction zone.

Since the two newly developed processes generally described above preferably or necessarily operate in the absence of added hydrogen and in the absence of added or even inherently present methane, the prior art techniques are not adaptable to serve the needs of these processes. Other typical heating techniques such as using direct fired furnaces or indirect heat exchange with a heating fluid, such as the multiring aromatics (Dowtherm), or the like have so many disadvantages that it would be preferred not to use them.

It is therefore an object of this invention to provide a novel heat transfer system.

It is another object of this invention to provide a heat transfer system uniquely suited to use with the process described above.

Other and additional objects of this invention will become apparent from a consideration of this entire specification including the claims hereof.

In accord with and fulfilling these objects, one aspect of this invention resides in a process comprising contacting an aliphatic hydrocarbon containing charge stock having a boiling range up to about 400°F with a ZSM-5 type of zeolite catalyst at about 650° to 1500°F and a space velocity up to about 15 WHSV under such combination of conditions as to convert a substantial portion of the aliphatics in the charge stock to aromatics boiling in the $C_5$ to 400°F range, recovering the liquid portion of the aromatization product, splitting such liquid into a product stream and a recycle stream, heating such recycle stream to an extent insufficient to substantially thermally degrade the aromatics therein but sufficient to provide the heat input necessary to sustain the referred to aromatization reaction, and admixing such heated recycle with the fresh feed to such process.

The aromatization reaction is endothermic. The amount of heat required is highly dependent on the nature of the feed. In a steady state operation of this process a portion of the highly aromatic product is recycled to the reactor where it is combined with fresh feed and heated to 1000°F. The recycle ratio, defined as weight of recycle product per weight of fresh feed, can vary between the limits of about 0.5 to 3.0 for a temperature drop of about 200°F in the reactor. As the product exits from the reactor, the gases are separated from the highly aromatic liquid (95% by weight). In general about 60% of the fresh feed is converted to liquid product, the rest is gaseous product. A pump is used to recycle the required amount of liquid from the separator pool back to the reactor entrance.

This solution to this particular problem is unique and especially adapted to solving this problem because aromatics constitute a major portion of the $C_5+$ (liquid) product and ZSM-5 type zeolite catalyst and aromatizing conditions utilized in these referred to processes and are substantially unaffected by the heat that they must carry in order to successfully operate as direct heat exchange agents.

According to this invention, the aromatization process utilized as a feed material $C_2$ to $C_4$ paraffins and/or $C_5$ to 400°F aliphatics and/or cycloparaffins respectively (midpoint up to about 250°F) which may or may not contain a certain proportion, suitably not more than about 60%, aromatics. This feed material may be derived from other processes in a petroleum refinery and therefore may be at an elevated temperature to start with. This is not a requirement of this process however, The feed may come from accumulated storage or otherwise and may well start out at ambient temperature conditions.

The feed material is introduced into an aromatization reactor containing a fixed or moving, e.g. possibly fluidized, catalyst bed of a ZSM-5 type zeolite type of catalyst described in great detail above. The aromatizing reactor preferably runs at about 850°F–1500°F and up to about 10 atmospheres absolute pressure depending upon the feed being used. The space velocity through the reactor should be about 1 to 15 WHSV. These reaction zone operating parameters are not part of the instant invention and are in fact to be considered to be per se well known in this art, at least to the developers of the referred to processes.

Aliphatic and cycloparaffinic components of the feed are aromatized, and converted to aromatics in contact with the ZSM-5 type of zeolite catalyst, while the aromatics content of the feed passes through virtually unchanged. It is possible that there may be some cracking of some side chains on the aromatic nucleii or alkylation of such aromatic vinys.

In any case, the aromatics rich product is resolved to provide a recycle stream, a product stream in a ratio of about 0.5 to 3 to 1, in the 100° to 400°F boiling range. This portion of the aromatics rich product is then heated to about 800° to 1500°F in a separate heater either by direct firing or via indirect heat exchange with superheated stream or other suitable heat exchange fluid and is then fed into admixture with the fresh feed.

The following Examples will serve to illustrate the practice of this invention without in any way being limiting thereon.

EXAMPLE 1

A fresh feed of a $C_5$ to 250°F virgin naphtha fraction was fed at a rate of 10 pounds per hour into a tubular reactor which was used filled with 10 pounds of H ZSM-5 catalyst. The space velocity in the reactor was 1 WHSV and the fresh feed, mixed with 25 pounds per hour of recycle aromatics rich liquid product, had an input temperature of 1100°F. The product had an exiting temperature of 850°F.

The product was resolved to separate the liquid and gas with the gas going to conventional gas plant and the liquid split to provide 25 pounds per hour of recycle as aforesaid. This side stream was heated to bring its temperature up to 1100°F whereupon it was mixed with fresh feed as aforesaid.

The yield of aromatics was 50% based on the weight of $C_5$ to 250°F aliphatics fed.

What is claimed is:

1. In the process of endothermically converting fresh feed comprising aliphatic hydrocarbons to a product consisting essentially of gas and a substantially aromatic liquid by contacting such with a ZSM-5 type of crystalline alumino silicate zeolite in the absence of added hydrogen at at a conversion temperature of 650° to 1500°F at an equivalent space velocity of up to about 15 WHSV; The improvement which comprises separating said gas and said aromatic liquid product; separating from said liquid product a substantially aromatic recycle stream; heating said separated recycle stream to a temperature which is insufficiently high to substantially degrade said aromatics but which is sufficiently high so that upon mixing said heated recycle stream with said fresh feed, the temperature of said admixture is a conversion temperature as aforesaid; mixing said heated portion and said fresh feed; and contacting said admixture with said zeolite.

2. The improved process claimed in claim 1 wherein said recycle stream is heated by indirect heat exchange to about 750° to 1100°F.

3. The improved process claimed in claim 1 wherein said aliphatic fresh feed contains up to 65% volume aromatics.

4. The improved process claimed in claim 1 wherein said fresh feed comprises a $C_5$ to 250°F aliphatic fraction.

5. The improved process claimed in claim 4 wherein said aliphatic fraction comprises at least one member selected from the group consisting of paraffins, olefins and naphthenes.

6. The improved process claimed in claim 4 wherein said conversion is carried out at about 850° to 1200°F and at a space velocity of about 1 to 15 WHSV.

7. The improved process claimed in claim 1 wherein said catalyst is Zn ZSM-5 zeolite.

8. The improved process claimed in claim 1 wherein said recycle has a weight relation to said feed of about 0.5–3 to 1.

* * * * *